United States Patent [19]
Smith

[11] 3,899,656
[45] Aug. 12, 1975

[54] SELF-CLEANING OVEN WITH TEMPERATURE LIMITING PROTECTION SYSTEM FOR BAKE AND CLEAN

[75] Inventor: Roy R. Smith, Dayton, Ohio

[73] Assignee: General Motors Corporation, Detroit, Mich.

[22] Filed: Dec. 13, 1974

[21] Appl. No.: 532,622

[52] U.S. Cl. ............................. 219/413; 219/398
[51] Int. Cl.² ....................................... F27D 11/02
[58] Field of Search ........... 219/393, 396, 398, 412, 219/413

[56] References Cited
UNITED STATES PATENTS

| | | |
|---|---|---|
| 3,327,094 | 6/1967 | Martin et al. ..................... 219/393 |
| 3,619,564 | 11/1971 | Schauer, Jr. ...................... 219/413 |
| 3,648,012 | 3/1972 | Holtkamp .......................... 219/413 |
| 3,686,476 | 8/1972 | Schauer, Jr. ...................... 219/413 |
| 3,806,700 | 4/1974 | Gilliom ............................. 219/413 |

Primary Examiner—Volodymyr Y. Mayewsky
Attorney, Agent, or Firm—Frederick M. Ritchie

[57] ABSTRACT

A self-cleaning oven having a limiter thermostat with a supplemental heater operable at different voltages to effect the interruption of power supply to an oven heating element when the oven temperature exceeds one value during a CLEAN mode of operation and to effect the interruption of power supply to an oven heating element when the oven temperature exceeds a lower value during a BAKE mode of operation.

5 Claims, 4 Drawing Figures

PATENTED AUG 12 1975
3,899,656
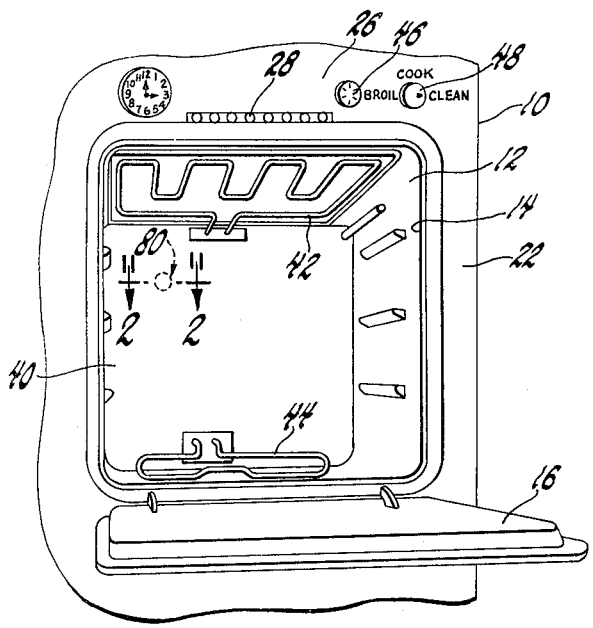
Fig.1
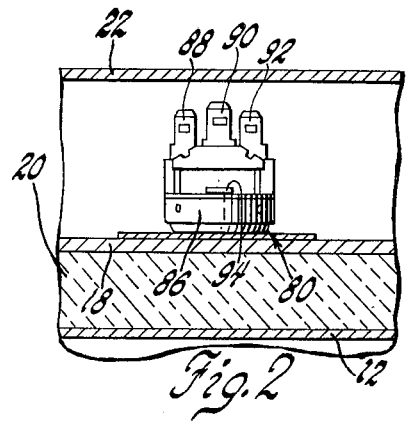
Fig.2
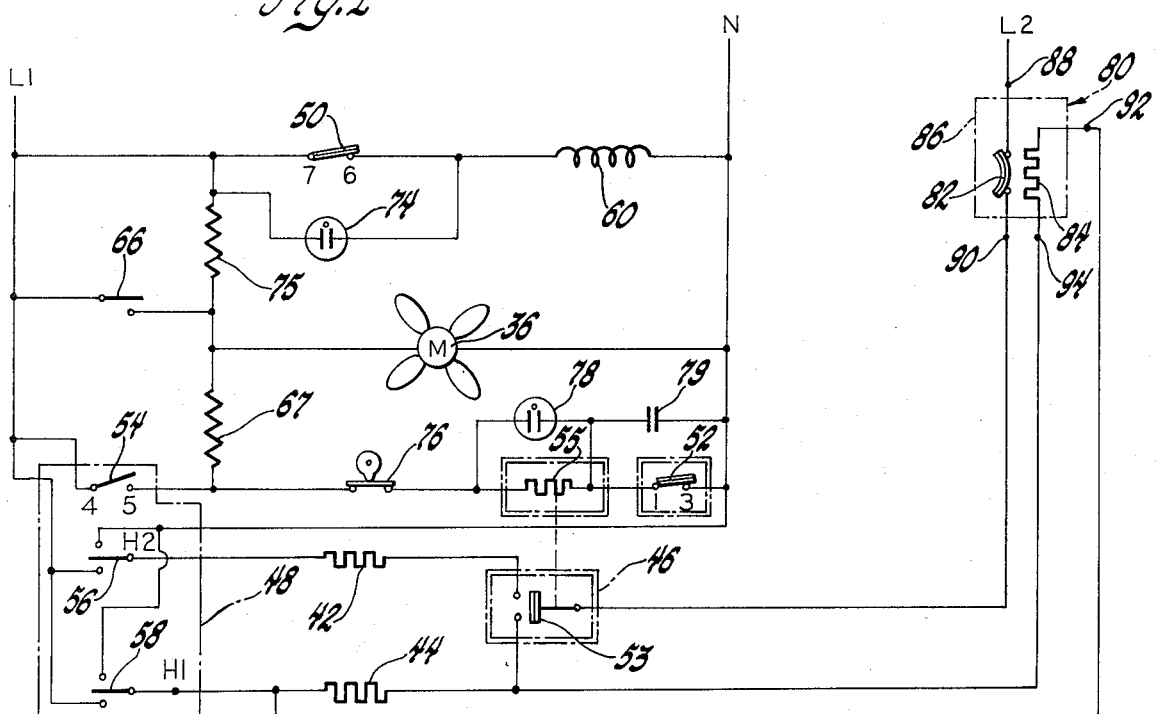
Fig.3
| OVEN THERMOSTAT AND CIRCUITRY CHART | | | | |
|---|---|---|---|---|
| CONTACT NO. | OFF | BAKE | BROIL | CLEAN |
| 4-5 | | X | X | |
| L1-H1 | | X | | |
| L1-H2 | | | X | X |
| N-H1 | | | | X |
| N-H2 | | X | | |
| 1-3 | | CYC. | CYC. | CYC. |
| 7-6 | X | X | X | |
Fig.4

SELF-CLEANING OVEN WITH TEMPERATURE LIMITING PROTECTION SYSTEM FOR BAKE AND CLEAN

This invention relates to oven cleaning systems of the pyrolytic type wherein electrical heating elements in the oven are selectively energized to heat the oven to baking and cleaning temperatures.

Typical self-cleaning ovens of the type to which this invention relates are disclosed in U.S. Pat. Nos. 3,327,094 and 3,619,564, each assigned to the same assignee as this invention. Such prior art ovens have BAKE and BROIL heating elements energizable selectively to raise the temperature within the oven for the BAKE and BROIL cooking modes of operation and for raising the temperature higher for pyrolytically cleaning the oven of soils deposited thereon during cooking. The latter of these patents discloses a temperature limiting protection system but does not protect at a lower temperature during BAKE when food may be in the oven.

Accordingly, a general object of this invention is improved circuitry to protect the oven from over-temperature conditions in both the BAKE and CLEAN modes of operation and in which the over-temperature protected against is lower in the BAKE mode of operation (when food may be in the oven) than it is in the CLEAN mode of operation (when food is not in the oven).

A more specific object of this invention in a self-cleaning oven having an oven heating element settable at different voltages respectively for BAKE and CLEAN modes of operation is the provision of improved over-temperature protective means for selectively protecting against temperatures in the oven above either a first or second predetermined temperature limit, wherein said protective means includes an enclosure housing a thermostatic oven temperature limiter switch in heat transfer relation with said enclosure and a supplemental heater in heat transfer relation with said limiter switch and in shunt with said oven heating element, and wherein said enclosure is mounted in heat transfer relation with the oven to sense indirectly temperature changes within said oven and said limiter switch is in power supply relation with said oven heating element to interrupt power supply to said heating element in the event oven temperature exceeds said first predetermined temperature limit during a BAKE mode of operation and to interrupt power supply to said heating element in the event oven temperature exceeds said second predetermined temperature limit during a CLEAN mode of operation.

Further objects and advantages of the present invention will be apparent from the following description, reference being had to the accompanying drawings wherein a preferred embodiment of the present invention is clearly shown.

IN THE DRAWINGS:

FIG. 1 is a fragmentary front perspective view of a self-cleaning oven provided with this invention;

FIG. 2 is a fragmentary sectional view of the temperature limiter switch of this invention taken along line 2—2 in FIG. 1;

FIG. 3 is a schematic diagram of circuitry incorporating this invention; and

FIG. 4 is a chart showing circuit and thermostat orientations for different modes of oven operation.

In accordance with this invention and with reference to FIG. 1, a built-in wall oven 10 is illustrated. The wall oven includes a box-like oven liner 12 having a front opening 14 closed by an access door 16. The oven liner 12 is surrounded by an inner oven cabinet or insulation retainer 18 spaced from the liner by fiber glass insulation 20. An outer oven cabinet 22 surrounds the insulated oven liner and is spaced from the inner oven cabinet 18 to form a cooling air passageway. The air passageway terminates at the front of the oven in a control panel 26 which includes an air outlet grille 28 overlying the oven access door 16.

A cooling air system is provided to envelop the insulated oven liner with a cooling air flow. For this purpose, the air passageway includes a blower means or motor-driven fan 36 which is operable to pull cooling air around the sides of the insulated oven liner and up the back thereof from whence the cooling air is forced out of the air outlet 28.

The self-cleaning oven includes heating means within the oven liner for heating the oven cavity 40. The heating means includes a broil-heating element 42 at the top of the oven liner and a bake-heating element 44 at the bottom. An oven temperature control assembly or oven thermostat means 46 is positioned on the control panel 26 and operates to control the heating means for providing in the oven cavity either a cooking temperature between 150° F. and 550° F. or a pyrolytic cleaning temperature of about 900° F.

With reference to the schematic wiring diagram in FIG. 3, the oven temperature control assembly or oven thermostat 46 includes those elements included within the double phantom line boxes. One pair of single pole, single throw (SPST) contacts 1, 3 (switch 52) cycle open and closed depending on oven temperature, opening and closing in response thereto an oven temperature responsive switch means 53 in series electrical power supply relationship with said heating means 42, 44. The switch 53 is part of a thermal relay including a heater 55 and, of course, could be used to control a gas valve where the power supply for the oven heating means is gas. When contacts 1, 3 are closed, the oven elements 42, 44 are heating; when opened, these elements are not heating. The assembly consists of a Bakelite switching case and a helium gas-filled capillary, bulb and bourden tube (not shown). The assembly may also correlate the operation of a transfer switch 48 in the oven circuitry which includes an SPST switch 54 and two single pole, double throw (SPDT) switches 56, 58. Another pair of SPST contacts 7, 6 (switch 50) in the oven circuitry are closed below an oven temperature of 560° F. and opened above an oven temperature of 560° F. When switch 50 is opened, a lock solenoid 60 is inoperable so that the access door 16 cannot be opened during a pyrolytic self-cleaning operation. The contacts 4, 5 (switch 54) in the transfer switch are essentially line switch contacts to the heater 55 of the thermal relay. Whenever contacts 4, 5 are opened (such as at "OFF" setting), the thermal relay heater 55 cannot be energized to close the relay contacts 53; whenever contacts 4, 5 are closed (such as "BAKE" or "BROIL" settings), the thermal relay heater can be energized depending upon whether the cycling contacts 52 are closed. At "CLEAN" setting, contacts 4, 5 are open but the circuit to the thermal relay heater 55 is provided through a fan control resistor 67 and the SPST interlock switch 66 which is closed when the door is closed and locked. The remaining contacts in the transfer switch portion of the oven circuitry are the SPDT switches 56, 58 (single poles beings H2, H1, respectively) through which 118 volts or 236 volts may be supplied selectively to the heating elements 42, 44, depending on whether the transfer switch 48 is set for "BAKE," "BROIL" or "CLEAN."

The circuitry may also include a lock lamp 74, operating in conjunction with a resistor 75, and adapted to illuminate when, during an oven cleaning cycle, the oven temperature exceeds 560° F. and the switch 50 opens. A conventional clock timer switch 76 is provided to time the oven cooking and cleaning operations. In this regard, an oven pilot light and capacitor circuit 78, 79 indicate the cycling of heating elements 42, 44.

In the prior art, oven thermostats have been calibrated to open as a temperature limiting device at one temperature. Generally, this temperature was around 1,000° F. or about 100° F. above the CLEAN temperature. Such an arrangement provides protection for the oven and its surroundings but does not protect against the overheating (650° F. – 750° F.) and consequent damage to a roast, for instance, which may happen to be in the oven cavity when the oven overheats. This invention protects a self-cleaning oven from over-temperature conditions in both the BAKE and CLEAN modes of operation.

The improved temperature limiting protection system includes an over-temperature protective means 80 comprising a resettable, thermostatic disc-like switch 82, a supplemental heater 84 in heat transfer with the switch 82 and a protective enclosure or housing 86 surrounding the switch and heater for mounting the device in the oven. Four electrical connectors or spades 88, 90, 92, 94 project from the housing for connecting the device into the oven circuitry. Spade 88 is connected to L2 of the power supply and spade 90 is connected to the oven temperature responsive switch means 53. Spades 92 and 94 are connected to opposite sides of the bake heating element 44, thereby to place the supplemental heater 84 in shunt with the bake heating element.

OPERATION

By connecting the supplemental heater 84 across the bake heating element, heater 84 is energized at 236 volts on BAKE and 118 volts on CLEAN. This is accomplished by switches 56, 58 when transfer switch 48 is set to BAKE or CLEAN. Thus, more heat is supplied to the thermostatic switch 82 during the BAKE mode of operation (236 volts) to bias the thermostatic switch to open at a lower oven temperature than it would during a CLEAN mode of operation (118 volts). As a result, the temperature is limited by switch 82 at one temperature (700° F.) on BAKE and at a higher temperature (1100° F.) on CLEAN.

After each temperature limiting operation of switch 82 and when the oven has cooled sufficiently, the disc thermostat of switch 82 resets and returns the oven to operation. This eliminates the field problem of nuisance trips. If there is in fact an oven control failure, it will be evident to the customer and the necessary repair can be made by the serviceman.

In a preferred embodiment, the oven protective means 80 is mounted with housing 86 engaging the rear insulation retainer 18 so that disc 82 receives some heat indirectly from the oven to help it control. More specifically, housing 86 should be mounted on a retainer wall location that gets to about 220° F. during a normal CLEAN cycle. A wide operating temperature differential is employed for thermostatic disc 82 to give better protection in the BAKE mode. A suggested temperature differential of 100° F. may be provided by designing switch 82 to open at 233° F. and close at 133° F. Heater 84 is designed to provide 5.8 watts of heat as a heat supplement to the thermostatic disc in the BAKE mode of operation and one quarter that amount in the CLEAN mode of operation. With these parameters, oven temperature will be limited at 1080° F. for CLEAN and 685° F. for BAKE.

While the embodiment of the present invention as herein disclosed constitutes a preferred form, it is to be understood that other forms might be adopted.

What is claimed is:

1. In an oven comprising an oven liner and an access door forming an oven cooking cavity, heating means for cooking food placed within the cavity as well as for pyrolytically removing food soil from the inner wall surfaces of the oven cavity, said heating means including a heating element and electrical power supply circuitry settable for energizing said heating element at high voltage when said circuitry is set for a BAKE mode of operation and for energizing said heating element at low voltage when said circuitry is set for a CLEAN mode of operation, oven thermostat means including oven temperature responsive switch means in said circuitry in power supply relationship with said heating means for controlling said heating element below first and second predetermined temperature limits, an oven cabinet surrounding the oven liner, and insulation between said oven liner and said oven cabinet, the invention comprising over-temperature protective means for selectively protecting against temperatures in said oven cavity above either of said first and second predetermined temperature limits, said protective means including an enclosure housing a thermostatic oven temperature limiter switch in heat transfer relation with said enclosure and a supplemental heater in heat transfer relation with said limiter switch, said supplemental heater connected in shunt with said heating element to provide more heat to said limiter switch during a BAKE mode of operation when said heating element is energized at high voltage than during a CLEAN mode of operation when said heating element is energized at low voltage, said enclosure mounted in heat transfer relation with said oven cabinet to sense indirectly temperature changes within said oven cavity, and said limiter switch in said circuitry in power supply relationship with said oven temperature responsive switch means thereby to interrupt power supply to said heating element during a BAKE mode of operation when oven temperature exceeds said first predetermined temperature limit and to interrupt power supply to said heating element during a CLEAN mode of operation when oven temperature exceeds said second predetermined temperature limit.

2. In an oven comprising an oven liner and an access door forming an oven cooking cavity, heating means for cooking food placed within the cavity as well as for pyrolytically removing food soil from the inner wall surfaces of the oven cavity, said heating means including a bake heating element and electrical power supply circuitry settable for energizing said heating element at high voltage when said circuitry is set for a BAKE mode of operation and for energizing said heating element at lower voltage when said circuitry is set for a CLEAN mode of operation, oven thermostat means including oven temperature responsive switch means in said circuitry in power supply relationship with said heating means for controlling said heating element below first and second predetermined temperature limits, an inner oven cabinet surrounding the oven liner, and insulation between said oven liner and said inner oven cabinet, the invention comprising over-temperature protective means for selectively protecting against temperatures in said oven cavity above either of said first and second predetermined temperature limits, said protective means including an enclosure housing a thermostatic oven temperature limiter switch in heat transfer relation with said enclosure and a supplemental heater in heat transfer relation with said limiter switch, said supplemental heater connected in shunt with said bake heating element to provide more heat to said limiter switch during a BAKE mode of operation when said bake heating element is energized at high voltage than during a CLEAN mode of operation when said bake heating element is energized at low voltage, said enclosure mounted in heat transfer relation with said inner oven cabinet to sense indirectly temperature changes within said oven cavity, and said limiter switch has a wide differential and is movable from closed position to open position in said circuitry while in power supply relationship with said oven temperature responsive switch means thereby to interrupt power supply to said bake heating element when said limiter switch moves to said open position during a BAKE mode of operation as oven temperature exceeds said first predetermined temperature limit and to interrupt power supply to said baking heating element when said limiter switch moves to said open position during a CLEAN mode of operation as oven temperature exceeds said second predetermined temperature limit.

3. The over-temperature protective means of claim 2 wherein said limiter switch is automatically resettable from its open position to its closed position and the wide differential thereof si substantially 100° F.

4. The over-temperature protective means of claim 2 wherein the supplemental heater supplies substantially 5.8 watts of heat to said limiter switch when said circuitry is set for a BAKE mode of operation.

5. An over-temperature protective means for a self-cleaning oven having a heating element and power supply circuitry settable for BAKE and CLEAN for controlling the supply of high and low power respectively to said heating element during BAKE and CLEAN and including oven temperature responsive switch means in control relationship with said heating element for supplying and interrupting power to said heating element below low and high predetermined oven temperature limits respectively when said circuitry is set for BAKE and CLEAN, said over-temperature protective means adapted to selectively protect against temperatures in said oven above said low and high predetermined temperature limits and comprising an automatically resettable thermostatic oven temperature limiter switch having a wide differential of substantially 100° F. and a supplemental heater having a rating of substantially 5.8 watts in heat transfer relation with said limiter switch, said supplemental heater adapted to be connected for operation with said heating element to provide more heat to said limiter switch during BAKE when said heating element is supplied at high power than during CLEAN when said heating element is supplied at low power, said limiter switch adapted for mounting in heat transfer relation with said oven in a manner to sense and respond indirectly to temperature changes within said oven, and said limiter switch adapted for installation in said circuitry in power supply control relationship with said oven temperature responsive switch means thereby to interrupt power supply to said heating element during BAKE when oven temperature exceeds said low predetermined temperature limit and to interrupt power supply to said heating element during CLEAN when oven temperature exceeds said high predetermined temperature limit.

* * * * *

UNITED STATES PATENT AND TRADEMARK OFFICE
CERTIFICATE OF CORRECTION

PATENT NO. : 3,899,656
DATED : August 12, 1975
INVENTOR(S) : Roy R. Smith

It is certified that error appears in the above-identified patent and that said Letters Patent are hereby corrected as shown below:

Column 5, line 1, cancel "lower" and substitute -- low --;
line 41, delete "si" and insert -- is --.

Signed and Sealed this twenty-fifth Day of November 1975

[SEAL]

Attest:

RUTH C. MASON
Attesting Officer

C. MARSHALL DANN
Commissioner of Patents and Trademarks